United States Patent
Misawa

(10) Patent No.: US 10,897,159 B2
(45) Date of Patent: Jan. 19, 2021

(54) WIRELESS POWER TRANSMISSION DEVICE AND WIRELESS POWER TRANSFER SYSTEM

(71) Applicant: TOYOTA JIDOSHA KABUSHIKI KAISHA, Toyota (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/412,741

(22) Filed: May 15, 2019

(65) Prior Publication Data
US 2019/0372395 A1    Dec. 5, 2019

(30) Foreign Application Priority Data

Jun. 5, 2018   (JP) ................................. 2018-107410

(51) Int. Cl.
| | | |
|---|---|---|
| *H02J 50/12* | (2016.01) | |
| *H02M 7/5387* | (2007.01) | |
| *H02J 7/02* | (2016.01) | |

(52) U.S. Cl.
CPC ........... *H02J 50/12* (2016.02); *H02M 7/5387* (2013.01); *H02J 7/025* (2013.01)

(58) Field of Classification Search
CPC .......... H02J 50/12; H02J 7/5387; H02J 7/025; H02J 50/80; H02J 50/90; H02M 7/5387; Y02T 90/14; Y02T 10/7072; Y02T 10/70; Y02T 10/72; B60L 2240/529; B60L 53/122; B60L 2210/40

See application file for complete search history.

(56) References Cited

U.S. PATENT DOCUMENTS

| | | |
|---|---|---|
| 9,979,238 B2 | 5/2018 | Misawa |
| 2013/0127409 A1 | 5/2013 | Ichikawa |
| 2013/0193749 A1 | 8/2013 | Nakamura et al. |
| 2015/0008877 A1 | 1/2015 | Ichikawa et al. |
| 2017/0018966 A1 | 1/2017 | Misawa |

FOREIGN PATENT DOCUMENTS

| | | | |
|---|---|---|---|
| JP | 2013-110822 A | 6/2013 | |
| JP | 2013-126327 A | 6/2013 | |
| JP | 2013-146148 A | 7/2013 | |
| JP | 2013-146154 A | 7/2013 | |
| JP | 2013-154815 A | 8/2013 | |
| JP | 2016-111902 A | 6/2016 | |
| WO | WO-2013165261 A2 * | 11/2013 | ......... G01R 27/2611 |

* cited by examiner

*Primary Examiner* — Daniel J Cavallari
(74) *Attorney, Agent, or Firm* — Oliff PLC

(57) ABSTRACT

An inverter generates transmission power at a prescribed frequency and supplies transmission power to a power transmitter. A power supply ECU is configured to carry out turn-on current control for controlling a turn-on current to a restriction value or less by manipulating a frequency of transmission power by means of the inverter. Turn-on current control includes first processing for determining a direction of manipulation of the frequency for lowering the turn-on current based on a direction of variation in turn-on current at the time when the frequency is varied.

6 Claims, 9 Drawing Sheets

WIRELESS POWER TRANSMISSION DEVICE AND WIRELESS POWER TRANSFER SYSTEM

This nonprovisional application is based on Japanese Patent Application No. 2018-107410 filed with the Japan Patent Office on Jun. 5, 2018, the entire contents of which are hereby incorporated by reference.

BACKGROUND

Field

The present disclosure relates to a wireless power transmission device and a wireless power transfer system and particularly to a technique for controlling an inverter in a wireless power transmission device configured to wirelessly transmit power to a power reception device.

Description of the Background Art

A power transfer system configured to wirelessly transfer power from a power transmission device to a power reception device has been known (see, for example, Japanese Patent Laying Open No. 2013-154815, Japanese Patent Laying Open No. 2013-146154, Japanese Patent Laying Open No. 2013-146148, Japanese Patent Laying Open No. 2013-110822, and Japanese Patent Laying Open No. 2013-126327). In such a power transfer system, the power transmission device includes an inverter which generates transmission power at a prescribed frequency and supplies transmission power to a power transmitter. In the inverter, when an output current (a turn-on current) identical in sign to an output voltage flows at the time of rise of the output voltage associated with a switching operation, a short-circuiting current (a recovery current) in an opposite direction flows to a freewheel diode at the time of the switching operation. Therefore, heat generation by the freewheel diode through which the short-circuiting current flows and a switching element increases, which causes increase in loss and may result in overheat abnormality. Flow of a turn-on current at the time of rise of an inverter output voltage corresponds to a phase of the output current advanced relative to the output voltage.

Japanese Patent Laying Open No. 2016-111902 discloses a technique for suppressing a recovery current. In a power transmission device described in this publication, when a phase of an output current from the inverter is advanced relative to an output voltage, a frequency of transmission power is manipulated in a direction to decrease an advance angle of a current phase. Specifically, a map showing relation among a coefficient of coupling between a power transmitter and a power receiver, a frequency of transmission power, and a current phase relative to a voltage phase is prepared in advance, and a frequency is regulated in a direction to decrease the advance angle of the current phase (that is, a direction to lower a turn-on current) by using a calculated value of the coefficient of coupling and the map. The turn-on current can thus be suppressed and the recovery current can be suppressed.

The power transmission device described in Japanese Patent Laying Open No. 2016-111902 requires preparation in advance through experiments of a map showing relation among a coefficient of coupling, a frequency, and a current phase relative to a voltage phase, and many man-hours and much cost may be required for generating the map. Furthermore, relation between a frequency and a phase (that is, relation between a frequency and a turn-on current) may be affected by a temperature, and by depending on the map, a direction of manipulation of a frequency for lowering a turn-on current may be incorrect.

SUMMARY

The present disclosure was made to solve such a problem and an object of the present disclosure is to reliably suppress a turn-on current in an inverter in a wireless power transmission device and a wireless power transfer system configured to wirelessly transmit power to a power reception device.

A wireless power transmission device in the present disclosure includes a power transmitter, an inverter, and a controller. The power transmitter is configured to wirelessly transmit power to a power reception device. The inverter is configured to generate transmission power at a prescribed frequency and supply transmission power to the power transmitter. The controller is configured to carry out turn-on current control for controlling a turn-on current to a restriction value or less by manipulating the frequency of transmission power by means of the inverter. Turn-on current control includes first processing for determining a direction of manipulation of the frequency for lowering the turn-on current based on a direction of variation in turn-on current when the frequency is varied.

A wireless power transfer system in to the present disclosure includes a power transmission device and a power reception device configured to wirelessly receive power from the power transmission device. The power transmission device includes a power transmitter, an inverter, and a controller. The power transmitter is configured to wirelessly transmit power to the power reception device. The inverter is configured to generate transmission power at a prescribed frequency and supply transmission power to the power transmitter. The controller is configured to carry out turn-on current control for controlling a turn-on current to a restriction value or less by manipulating the frequency of transmission power by means of the inverter. Turn-on current control includes first processing for determining a direction of manipulation of the frequency for lowering the turn-on current based on a direction of variation in turn-on current when the frequency is varied.

According to the wireless power transmission device and the wireless power transfer system, a direction of manipulation of a frequency for lowering a turn-on current is determined based on a direction of variation in turn-on current at the time when a frequency of transmission power is actually varied. Therefore, the turn-on current can reliably be suppressed.

The controller may further be configured to carry out power control for controlling the transmission power to a target and efficiency optimization control. Efficiency optimization control is control for searching for an optimal frequency for improving efficiency by oscillating the frequency while the transmission power is controlled to the target under power control. The first processing may include processing for determining the direction of manipulation of the frequency based on the direction of variation in turn-on current in accordance with oscillation of the frequency under the efficiency optimization control.

According to the power transmission device, a direction of manipulation of the frequency for lowering the turn-on current is determined by making use of oscillation of the frequency under efficiency optimization control. Therefore, the direction of manipulation of the frequency under turn-on current control can be determined in coordination with efficiency optimization control.

Power control may include power startup processing for having the transmission power reach the target by manipulating the frequency, after a duty of an output voltage from the inverter is increased to a prescribed value (for example, an upper limit value) at a prescribed startup frequency. Turn-on current control may include second processing for manipulating the frequency toward the startup frequency, while the power startup processing is being carried out when the turn-on current exceeds the restriction value.

During the power startup processing, the direction of manipulation of the frequency from the startup frequency is in conformity with a direction of increase in transmission power. Therefore, when the turn-on current exceeds the restriction value, the turn-on current can be lowered by lowering transmission power by manipulating the frequency toward the startup frequency.

The controller may control the inverter so as to stop generation of the transmission power when the turn-on current is more than the restriction value in spite of the turn-on current control.

Depending on a situation, the turn-on current may not be lowered to the restriction value or less in spite of turn-on current control. Since the power transmission device stops power transmission in such a case, the inverter can reliably be protected.

When the turn-on current is more than the restriction value in spite of turn-on current control, the controller may perform again the power startup processing with the startup frequency being changed after it has generation of the transmission power stopped.

An operating point (a frequency and a duty) of the inverter may be varied by changing the startup frequency. For example, when a lower limit (or an upper limit) of an available frequency band is set as the startup frequency, the operating point of the inverter may be varied by changing the startup frequency to the upper limit (or the lower limit) of the frequency band. Such a situation that the turn-on current is not lowered to the restriction value or less in spite of turn-on current control can thus be avoided.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
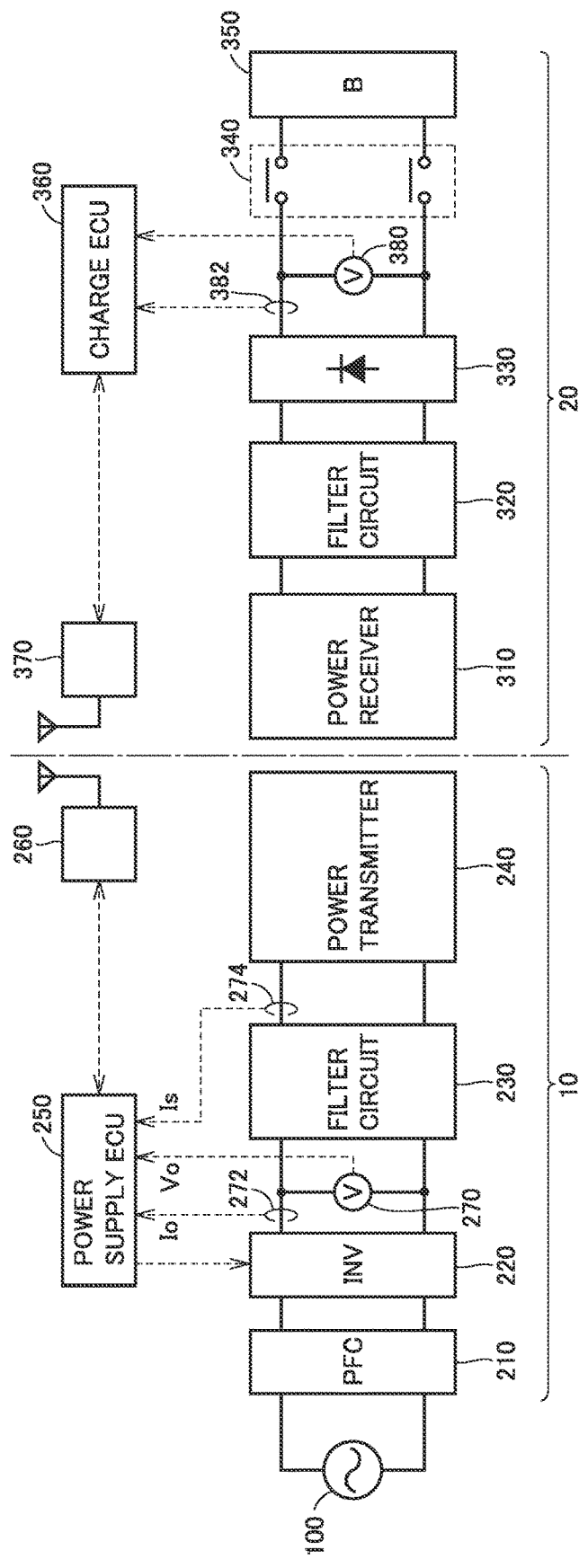
FIG. 1 is a diagram of an overall configuration of a wireless power transfer system according to an embodiment of the present disclosure.

An embodiment of the present disclosure will be described in detail below with reference to the drawings. The same or corresponding elements in the drawings have the same reference characters allotted and description thereof will not be repeated.

FIG. 1 is a diagram of an overall configuration of a wireless power transfer system according to an embodiment of the present disclosure. Referring to FIG. 1, the wireless power transfer system includes a power transmission device 10 and a power reception device 20. Power reception device 20 is mounted, for example, on a vehicle which can travel with electric power supplied from power transmission device 10 and stored therein.

Power transmission device 10 includes a power factor correction (PFC) circuit 210, an inverter 220, a filter circuit 230, and a power transmitter 240. Power transmission device 10 further includes a power supply electronic controller (ECU) 250, a communication unit 260, a voltage sensor 270, and current sensors 272 and 274.

PFC circuit 210 rectifies and boosts power received from an alternating current (AC) power supply 100 (for example, a system power supply) and supply resultant power to inverter 220, and corrects a power factor by making an input current more sinusoidal. Various known PFC circuits can be adopted for PFC circuit 210. Instead of PFC circuit 210, a rectifier without a power factor correction function may be adopted.

Inverter 220 is controlled by power supply ECU 250 and converts direct current (DC) power received from PFC circuit 210 into (AC) transmission power at a prescribed frequency (for example, several ten kHz). Inverter 220 can change a frequency of transmission power in a prescribed frequency band defined under standards by changing a switching frequency in accordance with a drive signal from power supply ECU 250. Transmission power generated by inverter 220 is supplied to power transmitter 240 through filter circuit 230. Inverter 220 is a voltage source inverter in which a freewheel diode is connected in anti-parallel to each switching element implementing inverter 220. Inverter 220 is implemented, for example, by a single-phase full bridge circuit.

Filter circuit 230 is provided between inverter 220 and power transmitter 240 and suppresses harmonic noise generated from inverter 220. Filter circuit 230 is implemented, for example, by an LC filter including an inductor and a capacitor.

Power transmitter 240 receives transmission power generated by inverter 220 through filter circuit 230 and wirelessly transmits power to a power receiver 310 of power reception device 20 through magnetic field generated around power transmitter 240. Power transmitter 240 includes a resonant circuit for wireless power transmission to power receiver 310. Though the resonant circuit is constituted of a coil and a capacitor, the capacitor does not have to be provided when a desired resonant state is formed by the coil alone.

Voltage sensor 270 detects an output voltage Vo from inverter 220 and outputs a detected value thereof to power supply ECU 250. Current sensor 272 detects an output current Io from inverter 220, that is, a current which flows through inverter 220, and outputs a detected value thereof to power supply ECU 250. Transmission power can be detected based on detection values from voltage sensor 270 and current sensor 272. Current sensor 274 detects a current Is which flows to power transmitter 240 and outputs a detected value thereof to power supply ECU 250.

Power supply ECU 250 includes a central processing unit (CPU), a read only memory (ROM) which stores a processing program, a random access memory (RAM) which temporarily stores data, and an input and output port for input and output of various signals (none of which is shown), and receives a signal from each sensor described above and controls various types of equipment in power transmission device 10. Various types of control can also be processed by dedicated hardware (electronic circuits) without being limited to processing by software. A configuration of power supply ECU 250 and control carried out by power supply ECU 250 will be described in detail later.

Communication unit 260 is configured to wirelessly communicate with a communication unit 370 of power reception device 20. Communication unit 260 exchanges information on start/stop of power transfer with power reception device 20 or receives a condition of power reception (a power reception voltage, a power reception current, and received power) by power reception device 20.

Power reception device 20 includes power receiver 310, a filter circuit 320, a rectification unit 330, a relay circuit 340, and a power storage device 350. Power reception device 20 further includes a charge ECU 360, communication unit 370, a voltage sensor 380, and a current sensor 382.

Power receiver 310 wirelessly receives (AC) power output from power transmitter 240 of power transmission device 10 through magnetic field. Power receiver 310 includes a resonant circuit for wirelessly receiving power from power transmitter 240. Though the resonant circuit is constituted of a coil and a capacitor, the capacitor does not have to be provided when a desired resonant state is formed by the coil alone.

Filter circuit 320 is provided between power receiver 310 and rectification unit 330 and suppresses harmonic noise generated during reception of power by power receiver 310. Filter circuit 320 is implemented, for example, by an LC filter including an inductor and a capacitor. Rectification unit 330 rectifies AC power received by power receiver 310 and outputs rectified AC power to power storage device 350. Rectification unit 330 includes a smoothing capacitor together with a rectifier.

Power storage device 350 is a power storage element configured to be chargeable and dischargeable. Power storage device 350 includes a secondary battery such as a lithium ion battery or a nickel metal hydride battery and a power storage element such as an electric double layer capacitor. A lithium ion secondary battery represents a secondary battery in which lithium is employed as a charge carrier, and may encompass not only a general lithium ion secondary battery containing a liquid electrolyte but also what is called an all-solid-state battery containing a solid electrolyte. Power storage device 350 stores power output from rectification unit 330. Power storage device 350 then supplies stored power to a not-shown load driving device.

Relay circuit 340 is provided between rectification unit 330 and power storage device 350. Relay circuit 340 is turned on (rendered conductive) when power storage device 350 is charged by power transmission device 10. Voltage sensor 380 detects an output voltage (a power reception voltage) from rectification unit 330 and outputs a detected value thereof to charge ECU 360. Current sensor 382 detects an output current (a power reception current) from rectification unit 330 and outputs a detected value thereof to charge ECU 360. Power received by power receiver 310 (which corresponds to charging power for power storage device 350) can be detected based on detection values from voltage sensor 380 and current sensor 382. Voltage sensor 380 and current sensor 382 may be provided between power receiver 310 and rectification unit 330 (for example, between filter circuit 320 and rectification unit 330).

Charge ECU 360 includes a CPU, a ROM, a RAM, and an input and output port (none of which is shown), and receives signals from sensors and controls various types of equipment in power reception device 20. Various types of control can also be processed by dedicated hardware (electronic circuits) without being limited to processing by software.

Communication unit 370 is configured to wirelessly communicate with communication unit 260 of power transmission device 10. Communication unit 370 exchanges information on start/stop of power transfer with power transmission device 10 or transmits a condition of power reception by power reception device 20 to power transmission device 10.

Figure 2:
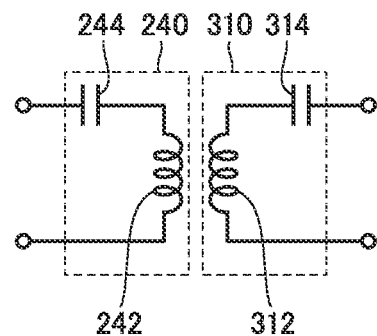
FIG. 2 is a diagram showing one example of a circuit configuration of a power transmitter and a power receiver shown in FIG. 1.

FIG. 2 is a diagram showing one example of a circuit configuration of power transmitter 240 and power receiver 310 shown in FIG. 1. Referring to FIG. 2, power transmitter 240 includes a power transmission coil 242 and a capacitor 244. Capacitor 244 is connected in series to power transmission coil 242 and forms a resonant circuit together with power transmission coil 242. Capacitor 244 is provided to regulate a resonant frequency of power transmitter 240. A Q factor representing resonance intensity of the resonant circuit constituted of power transmission coil 242 and capacitor 244 is preferably not smaller than 100.

Power receiver 310 includes a power reception coil 312 and a capacitor 314. Capacitor 314 is connected in series to power reception coil 312 and forms a resonant circuit together with power reception coil 312. Capacitor 314 is provided to regulate a resonant frequency of power receiver 310. A Q factor of the resonant circuit constituted of power reception coil 312 and capacitor 314 is also preferably not smaller than 100.

In each of power transmitter 240 and power receiver 310, the capacitor may be connected in parallel to the coil. When a desired resonant frequency can be achieved without a capacitor, the capacitor does not have to be provided.

A structure of power transmission coil 242 and power reception coil 312 is not particularly limited. For example, when power transmitter 240 and power receiver 310 face each other, a spiral or helical coil wound around an axis along a direction in which power transmitter 240 and power receiver 310 are aligned can be adopted for each of power transmission coil 242 and power reception coil 312. Alternatively, when power transmitter 240 and power receiver 310 face each other, a coil obtained by winding an electric wire around a ferrite plate having a direction of alignment of power transmitter 240 and power receiver 310 as its direction of normal may be adopted for each of power transmission coil 242 and power reception coil 312.

Referring again to FIG. 1, in the wireless power transfer system, AC transmission power is supplied from inverter 220 through filter circuit 230 to power transmitter 240 in power transmission device 10. Each of power transmitter 240 and power receiver 310 includes a resonant circuit and is designed to resonate at a frequency of transmission power.

When AC transmission power is supplied from inverter 220 through filter circuit 230 to power transmitter 240, energy (electric power) moves from power transmitter 240 to power receiver 310 through magnetic field formed between power transmission coil 242 of power transmitter 240 and power reception coil 312 of power receiver 310. Energy (electric power) which has moved to power receiver 310 is supplied to power storage device 350 through filter circuit 320 and rectification unit 330.

Figure 3:
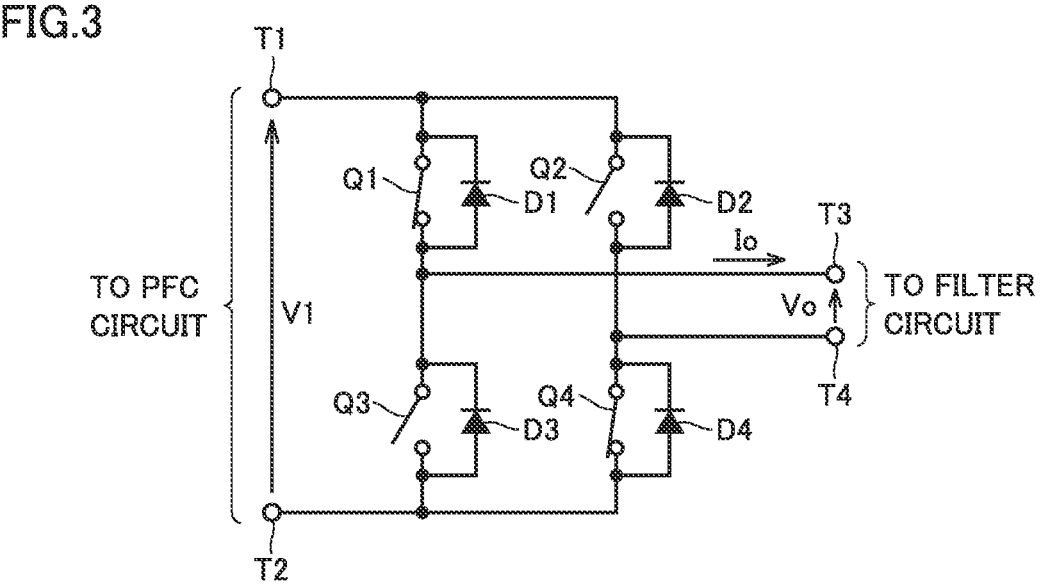
FIG. 3 is a diagram showing a circuit configuration of an inverter shown in FIG. 1.

FIG. 3 is a diagram showing a circuit configuration of inverter 220 shown in FIG. 1. Referring to FIG. 3, inverter 220 is a voltage source inverter and includes power semiconductor switching elements (which are also simply referred to as "switching elements" below) Q1 to Q4 and freewheel diodes D1 to D4. PFC circuit 210 (FIG. 1) is connected to terminals T1 and T2 on a DC side and filter circuit 230 (FIG. 1) is connected to terminals T3 and T4 on an AC side.

Switching elements Q1 to Q4 are each implemented, for example, by an insulated gate bipolar transistor (IGBT), a bipolar transistor, a metal oxide semiconductor field effect transistor (MOSFET), or a gate turn off thyristor (GTO). Freewheel diodes D1 to D4 are connected in anti-parallel to switching elements Q1 to Q4, respectively.

A DC voltage V1 output from PFC circuit 210 is applied across terminals T1 and T2. With a switching operation by switching elements Q1 to Q4, output voltage Vo and output current Io are generated across terminals T3 and T4 (a direction shown with an arrow in the figure being defined as a positive value). FIG. 3 shows a state that switching elements Q1 and Q4 are turned on and switching elements Q2 and Q3 are turned off by way of example, and output voltage Vo is at voltage V1 (a positive value).

Figure 4:
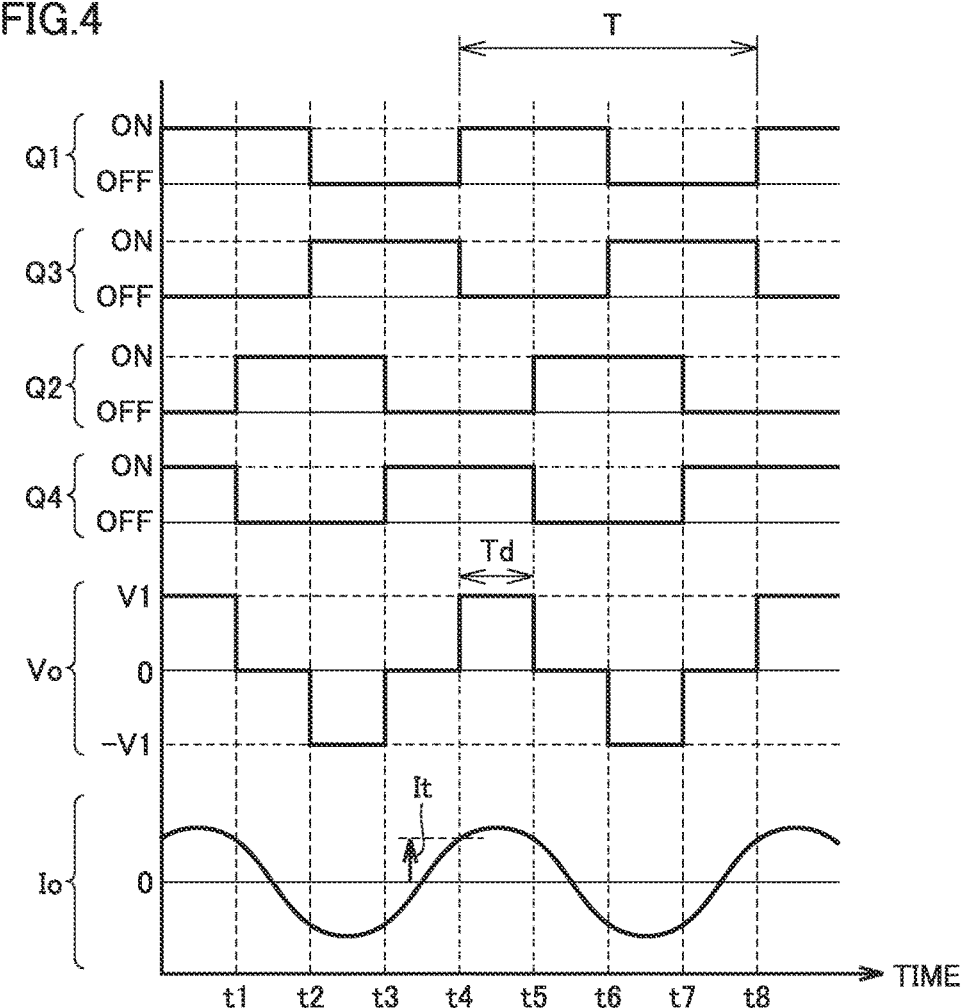
FIG. 4 is a diagram showing a waveform of switching of the inverter and waveforms of an output voltage and an output current.

FIG. 4 is a diagram showing a waveform of switching of inverter 220 and waveforms of output voltage Vo and output current Io. In the figure, T represents a switching cycle of inverter 220. Inverter 220 has a switching frequency of 1/T.

Referring to FIG. 3 together with FIG. 4, by turning on/off switching elements Q1 to Q4 as illustrated, output voltage Vo having a square wave which varies at a switching frequency is generated. By manipulating (changing) the switching frequency of inverter 220, a frequency of transmission power generated by inverter 220 can be regulated.

Td represents a time period of output of output voltage Vo. A period ratio of Td to cycle T is defined as a duty of an output voltage from the inverter. By varying on/off timing (on/off period ratio of 0.5) of switching elements Q2 and Q4 relative to on/off timing (on/off period ratio of 0.5) of switching elements Q1 and Q3, the duty of the output voltage from the inverter can be regulated. FIG. 4 shows an example in which the duty is set to 0.25 and the upper limit of the duty is set to 0.5.

Transmission power can be varied by regulating the duty of output voltage Vo. Qualitatively, transmission power can be increased by increasing the duty and can be decreased by decreasing the duty. In the embodiment, power supply ECU 250 carries out transmission power control for controlling transmission power to target power by manipulating the duty of output voltage Vo.

An instantaneous value of output current Io at the time of rise (time t4 or t8) of output voltage Vo represents a turn-on current It. A value of turn-on current It is varied by voltage V1 provided from PFC circuit 210 to inverter 220 or a switching frequency of inverter 220 (a frequency of transmission power).

FIG. 4 shows an example in which positive turn-on current It flows. When positive turn-on current It flows, a short-circuiting current (a recovery current) in an opposite direction flows through freewheel diode D3 connected in anti-parallel to switching element Q3 at the time of rise (time t4 or t8) of output voltage Vo. Therefore, heat generation by freewheel diode D3 through which the short-circuiting current flows and switching element Q1 increases and loss in inverter 220 increases.

Switching loss and conduction loss define main power loss in power transmission device 10. Switching loss refers to power loss caused at the time of a switching operation (turn-on or turn-off) of inverter 220. In power transmission device 10, power loss due to turn-on current It at the time of a switching operation by inverter 220 represents dominant switching loss. Conduction loss refers to power loss caused by conduction. In power transmission device 10, power loss due to heat generation resulting from conduction of power transmission coil 242 and inverter 220 represents dominant conduction loss.

In the embodiment, power supply ECU 250 detects power loss in power transmission device 10. Specifically, the sum of power loss due to turn-on current It, power loss due to a current which flows through power transmission coil 242, and power loss due to a current which flows through inverter 220 is detected as power loss in power transmission device 10.

Figure 5:
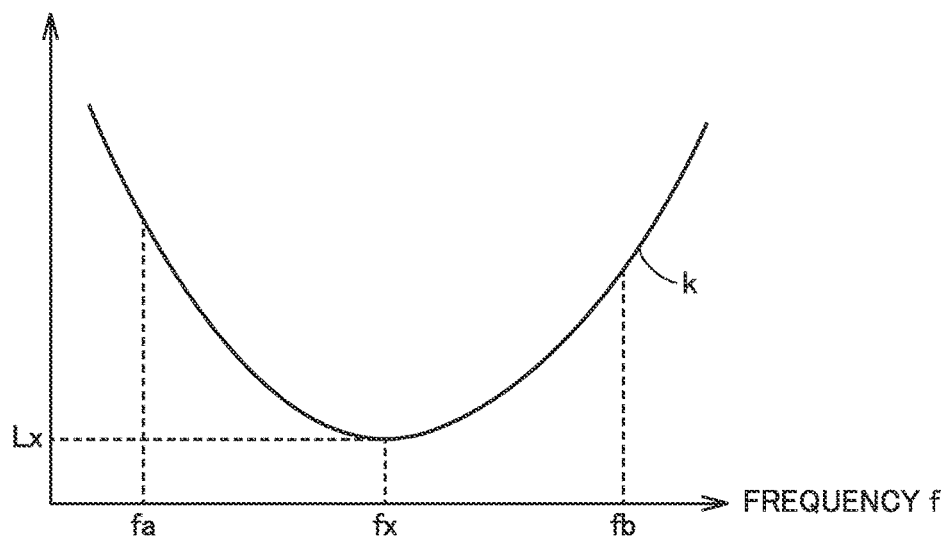
FIG. 5 is a diagram showing one example of relation between power loss in a power transmission device and a frequency f of transmission power.

Power loss in power transmission device 10 is varied by a switching frequency of inverter 220 (a frequency of transmission power). FIG. 5 is a diagram showing one example of relation between power loss in power transmission device 10 and frequency f of transmission power. In FIG. 5, fa and fb represent lower limit and upper limit frequencies of an available frequency band defined under standards, respectively.

Referring to FIG. 5, relation between frequency f of transmission power (abscissa) and power loss in power transmission device 10 (ordinate) is shown with a curve k which projects downward. When frequency f is set to an optimal frequency fx, power loss in power transmission device 10 is minimized (a relative minimum value Lx).

In the embodiment, power supply ECU 250 carries out efficiency optimization control for improving efficiency by minimizing power loss in power transmission device 10, by manipulating frequency f of transmission power (manipulating a switching frequency of inverter 220). Though details will be described later, power supply ECU 250 carries out control for searching for optimal frequency fx by oscillating frequency f (extreme value search) and having frequency f converge to optimal frequency fx.

In the embodiment, though the sum of power loss due to turn-on current It, power loss due to a current which flows through power transmission coil 242, and power loss due to a current which flows through inverter 220 is minimized under efficiency optimization control, efficiency optimization control may be carried out to minimize any of the power losses or the sum of two of them.

With increase in turn-on current It, a recovery current (short-circuiting current) also increases, and a freewheel diode through which the short-circuiting current flows and a switching element may suffer from overheat abnormality. Therefore, in the embodiment, a restriction value is set for turn-on current It, and power supply ECU 250 carries out turn-on current control for controlling turn-on current It to a restriction value or less. A value of turn-on current It is varied by a switching frequency of inverter 220. Therefore, when turn-on current It exceeds a restriction value, power supply ECU 250 lowers the turn-on current by manipulating frequency f of transmission power (manipulating a switching frequency of inverter 220).

Frequency f is manipulated in both of turn-on current control and efficiency optimization control described above, and hence they may interfere with each other. Turn-on current control is carried out from a point of view of protection of inverter 220 and higher in priority than efficiency optimization control. Then, in the embodiment, turn-on current control is carried out in preference to efficiency optimization control. When efficiency optimization control is being carried out at the time when turn-on current It exceeds the restriction value, power supply ECU 250 stops efficiency optimization control and carries out turn-on current control. When turn-on current It is equal to or less than the restriction value, turn-on current control is inactivated and hence efficiency optimization control is resumed.

Figure 6:
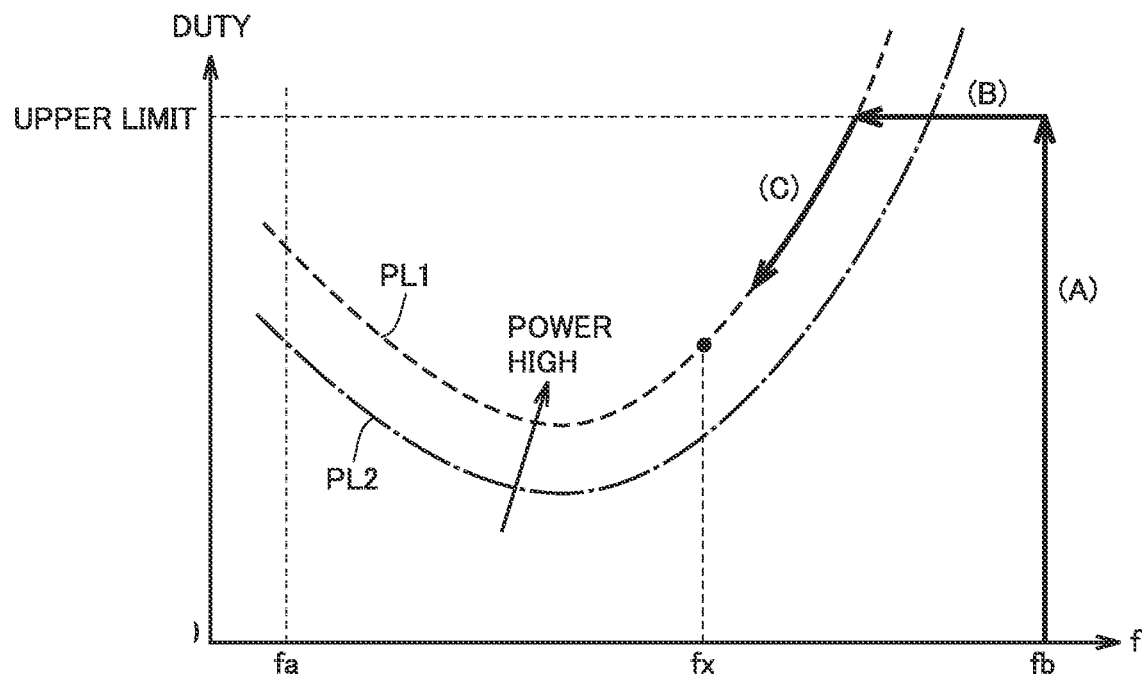
FIG. 6 is a diagram showing an example of manipulation of a duty of an output voltage from the inverter and frequency f of transmission power.

FIG. 6 is a diagram showing an example of manipulation of a duty of an output voltage from the inverter and frequency f of transmission power. FIG. 6 shows an example of manipulation of a duty and frequency f from immediately after start of power transmission.

Referring to FIG. 6, each of lines PL1 and PL2 represents a contour line of transmission power. Transmission power shown with line PL1 is higher than transmission power shown with line PL2. As is seen in the figure, a duty at which certain transmission power is achieved is frequency-dependent. In this example, transmission power shown with line PL1 is defined as target power.

When start of power transmission is indicated by an operation by a user or arrival of time indicated by a timer, power supply ECU 250 carries out power startup processing for starting up transmission power and having transmission power reach target power. Specifically, power supply ECU 250 initially starts power transmission with an operating frequency of inverter 220 (frequency f of transmission power) being set to a prescribed startup frequency and increases a duty (a line A in the figure). In this example, upper limit fb of the available frequency band defined under standards is set as the startup frequency. The startup frequency is not limited as such and it may be set to lower limit fa of the frequency band or a frequency different from lower limit fa and upper limit fb.

In this example, transmission power is obtained at a duty lower than that corresponding to lower limit fa or a frequency close to upper limit fb in a frequency region intermediate between lower limit fa and upper limit fb (which is referred to as an "intermediate region" below). Therefore, in the intermediate region, turn-on current It tends to be high due to a high power factor, and turn-on current It is highly likely to exceed the restriction value. In this example, frequency f is regulated from the startup frequency, with upper limit fb (which may be lower limit fa) of the frequency band being set as the startup frequency.

When the duty reaches the upper limit (0.5), power supply ECU 250 manipulates frequency f while it maintains the duty at the upper limit (a line B in the figure). Since upper limit fb of the frequency band is set as the startup frequency in this example, power supply ECU 250 brings transmission power closer to target power by lowering frequency f.

When transmission power reaches target power (line PL1), power supply ECU 250 quits power startup processing and searches for optimal frequency fx by manipulating frequency f under efficiency optimization control while it maintains transmission power at target power by regulating the duty (a line C in the figure). Power transmission at high efficiency can thus be achieved while transmission power is controlled to target power.

Frequency f is manipulated also in power startup processing, and hence turn-on current control and power startup processing interfere with each other (since efficiency optimization control is activated after power startup processing, efficiency optimization control and power startup processing do not interfere with each other). In the embodiment, turn-on current control is carried out in preference to power startup processing. When frequency f is being manipulated during power startup processing at the time when turn-on current It exceeds the restriction value (line B in the figure), power supply ECU 250 stops power startup processing and carries out turn-on current control.

Figure 7:
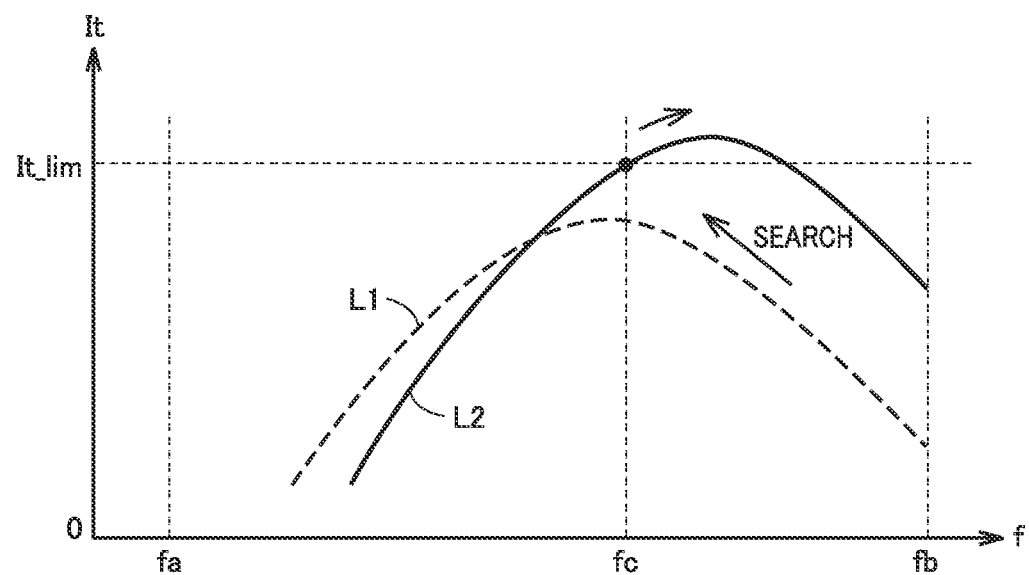
FIG. 7 is a diagram showing an example of a frequency characteristic of a turn-on current.

FIG. 7 is a diagram showing an example of a frequency characteristic of turn-on current It. Referring to FIG. 7, a dotted line L1 represents one example of a frequency characteristic of turn-on current It immediately after start of power transmission. A solid line L2 represents one example of a frequency characteristic of turn-on current It after lapse of a certain period of time since start of power transmission. A frequency characteristic of turn-on current It may thus vary during power transmission. For example, when a coefficient of coupling between coils or a temperature is varied during power transmission, a frequency characteristic of turn-on current It may vary.

When turn-on current It reaches a restriction value It_lim by varying frequency f from a side of the startup frequency (in this example, lowered from upper limit fb), it is also considered that turn-on current It can be lowered by manipulating (increasing in this example) frequency f toward the original startup frequency.

When the frequency characteristic of turn-on current It is varied as shown with solid line L2 at the time when turn-on current It reached restriction value It_lim during efficiency optimization control, turn-on current It increases to the contrary by manipulating (increasing in this example) frequency f toward the original startup frequency. Therefore, under such control that frequency f is varied toward the startup frequency on all occasions when turn-on current It reaches restriction value It_lim, turn-on current It cannot reliably be lowered.

In the wireless power transfer system according to the embodiment, power supply ECU 250 varies frequency f of transmission power and senses variation in turn-on current It at that time. Then, power supply ECU 250 determines a direction of manipulation of frequency f for lowering turn-on current It based on a direction of variation in turn-on current It with variation in frequency f. Turn-on current It can thus reliably be suppressed.

In the embodiment, optimal frequency fx is searched for by oscillating frequency f under efficiency optimization control. Then, in the wireless power transfer system, a direction of variation in turn-on current It with variation in frequency f is sensed by using oscillation of frequency f under efficiency optimization control, and based on a result of sensing, a direction of manipulation of frequency f for lowering turn-on current It is determined. The direction of manipulation of the frequency for lowering turn-on current It can thus be determined in coordination with efficiency optimization control.

When frequency f is being manipulated in power startup processing (line B in FIG. 6), transmission power is lowered by returning frequency f toward the startup frequency and accordingly turn-on current It is also lowered. Then, in the wireless power transfer system, when power supply ECU 250 is performing power startup processing at the time when turn-on current It exceeds the restriction value, it manipulates frequency f toward the startup frequency without sensing the direction of variation in turn-on current It with variation in frequency f.

Figure 8:
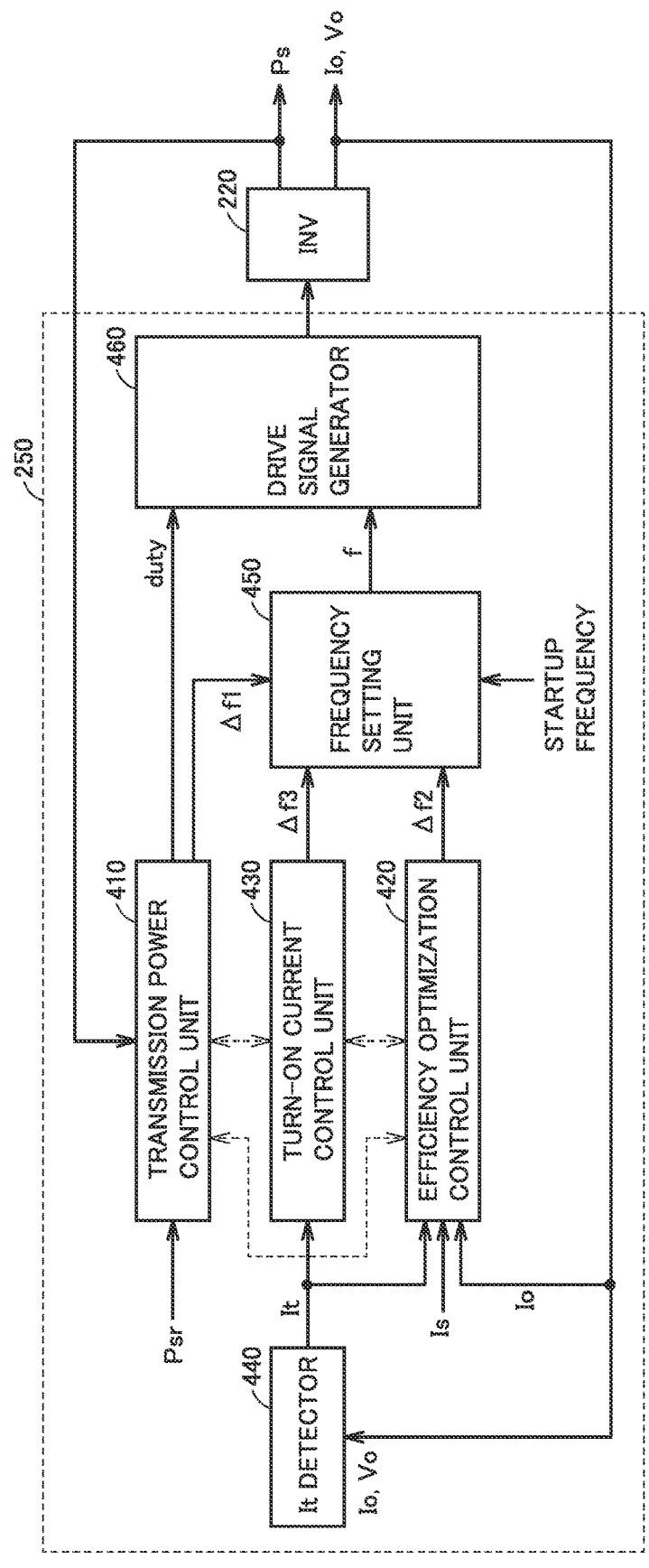
FIG. 8 is a control block diagram of control carried out by a power supply ECU.

FIG. 8 is a control block diagram of control carried out by power supply ECU 250. Referring to FIG. 8, power supply ECU 250 includes a transmission power control unit 410, an efficiency optimization control unit 420, a turn-on current control unit 430, a turn-on current detector (which is also referred to as an "It detector" below) 440, a frequency setting unit 450, and a drive signal generator 460.

Transmission power control unit 410 receives target power Psr representing a target of transmission power Ps and a detected value of transmission power Ps. Target power Psr is generated, for example, based on a condition of power reception by power reception device 20. In the embodiment, target power Psr is generated in power reception device 20 based on a difference between target reception power and the detected value, and transmitted from power reception device 20 to power transmission device 10. Transmission power Ps is calculated, for example, based on detection values from voltage sensor 270 and current sensor 272 (FIG. 1).

When start of power transmission is indicated, transmission power control unit 410 performs power startup processing for starting up transmission power Ps and having transmission power Ps reach target power Psr. Unlike feedback (FB) for controlling a duty based on a power difference which will be described later, power startup processing is feedforward (FF) type control for manipulating a duty and frequency f in accordance with a procedure defined in advance.

Specifically, transmission power control unit 410 sets an operating frequency of inverter 220 (frequency f of transmission power) to a prescribed startup frequency and sets a duty command value duty representing a command value for a duty of an output voltage from the inverter to the upper limit (0.5). Duty command value duty is output to drive signal generator 460.

When the duty reaches the upper limit, transmission power control unit 410 outputs a frequency manipulation amount Δf1 in a direction of increase in transmission power Ps while it maintains duty command value duty at the upper limit. Frequency manipulation amount Δf1 is output to frequency setting unit 450. Frequency manipulation amount Δf1 is predetermined in accordance with the startup frequency. For example, when the startup frequency is set to upper limit fb, negative frequency manipulation amount Δf1 is output, and when the startup frequency is set to lower limit fa, positive frequency manipulation amount Δf1 is output. Frequency manipulation amount Δf1 is output until transmission power Ps reaches target power Psr.

When transmission power Ps reaches target power Psr as a result of power startup processing above, transmission power control unit 410 quits power startup processing and carries out power FB control based on a difference between target power Psr and transmission power Ps (power difference). For example, transmission power control unit 410 calculates an amount of manipulation by carrying out PI control with the power difference being received as an input, and outputs the calculated amount of manipulation as duty command value duty to drive signal generator 460.

While transmission power control unit 410 is performing power startup processing, it outputs a notification to that effect to efficiency optimization control unit 420 and turn-on current control unit 430 in order to inactivate efficiency optimization control by efficiency optimization control unit 420 while it is performing power startup processing. This is because, in turn-on current control unit 430, as described above, processing for determining a direction of manipulation of frequency f is different between power startup processing and efficiency optimization control following power startup processing.

When transmission power control unit 410 is receiving a notification to the effect that turn-on current control is active from turn-on current control unit 430, it stops transmission power control. Specifically, when transmission power control unit 410 has been outputting non-zero frequency manipulation amount Δf1, it now outputs frequency manipulation amount Δf1 set to 0 while it maintains duty command value duty at a previous value.

It detector 440 detects turn-on current It based on detected values of output voltage Vo and output current Io from inverter 220. Specifically, It detector 440 senses rise of output voltage Vo and detects a value of output current Io at the time of rise of output voltage Vo as turn-on current It.

Efficiency optimization control unit 420 receives a value of turn-on current It detected by It detector 440, a detected value of current Is which flows through power transmission coil 242, and a detected value of output current Io from inverter 220. Efficiency optimization control unit 420 detects power loss in power transmission device 10 based on each of these detected values and searches for optimal frequency fx at which power loss is minimized (relative minimum). Efficiency optimization control unit 420 calculates a frequency manipulation amount Δf2 in a direction in which frequency f is closer to optimal frequency fx and outputs the frequency manipulation amount to frequency setting unit 450.

Efficiency optimization control unit 420 also stops efficiency optimization control when it is receiving a notification to the effect that turn-on current control is active from turn-on current control unit 430. Namely, efficiency optimization control unit 420 outputs frequency manipulation amount Δf2 set to 0.

Efficiency optimization control unit 420 inactivates efficiency optimization control also when it is receiving a notification to the effect that power startup processing is being performed from transmission power control unit 410. Namely, efficiency optimization control unit 420 outputs frequency manipulation amount Δf2 set to 0.

Figure 9:
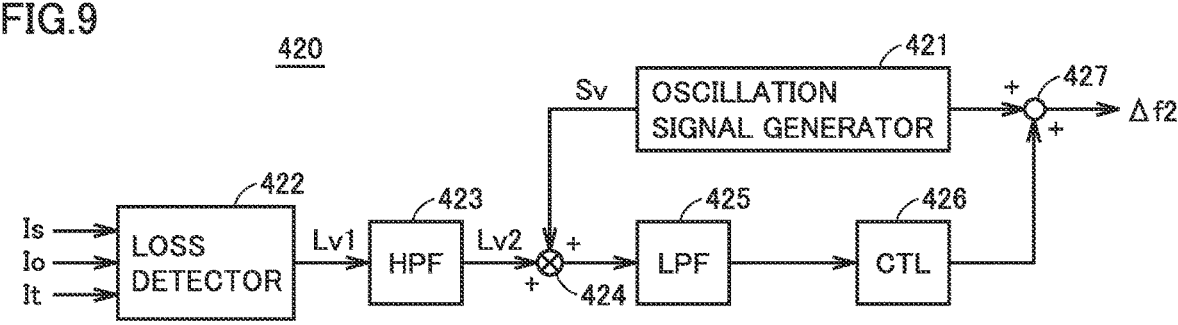
FIG. 9 is a control block diagram of an efficiency optimization control unit shown in FIG. 8.

FIG. 9 is a control block diagram of efficiency optimization control unit 420 shown in FIG. 8. Referring to FIG. 9, efficiency optimization control unit 420 includes an oscillation signal generator 421, a loss detector 422, a high-pass filter (HPF) 423, a multiplier 424, a low-pass filter (LPF) 425, a controller 426, and an adder 427.

Oscillation signal generator 421 generates an oscillation signal Sv for oscillating frequency f and outputs the oscillation signal to multiplier 424 and adder 427. Oscillation signal Sv is a pulse signal which repeats on/off in prescribed oscillation cycles and has a prescribed amplitude. In extreme value search adopted in efficiency optimization control carried out by efficiency optimization control unit 420, change to optimal frequency fx (a frequency at which power loss in power transmission device 10 is minimized (relative minimum)) of frequency f is monitored by using oscillation signal Sv.

Loss detector 422 detects power loss in power transmission device 10 based on detected values of turn-on current It, current Is which flows through power transmission coil 242, and output current Io from inverter 220. The sum of power loss due to the turn-on current, power loss due to a current which flows through power transmission coil 242, and power loss due to a current which flows through inverter 220 define detected power loss. A detected value of output current Io corresponds to a current which flows through inverter 220.

Information representing relation of turn-on current It, current Is, and current Io with power loss (which is referred to as "loss information" below) is used for detecting power loss. Loss detector 422 can find power loss based on detected values of turn-on current It, current Is, and current Io by referring to loss information stored in the ROM of power supply ECU 250 in advance. Loss information may be represented by a map, an expression, or a model.

Loss detector 422 repeatedly detects power loss in prescribed cycles. A waveform Lv1 of power loss is generated through cyclic detection of power loss. Loss detector 422 outputs generated waveform Lv1 of power loss to HPF 423.

HPF 423 extracts a high-frequency component Lv2 from waveform Lv1 of power loss (a signal obtained by removing a DC component from waveform Lv1 of power loss) and outputs the high-frequency component to multiplier 424. High-frequency component Lv2 represents an amount of variation in power loss when frequency f is oscillated by oscillation signal Sv.

Multiplier 424 calculates a coefficient of correlation between oscillation signal Sv and high-frequency component Lv2 by multiplying high-frequency component Lv2 by oscillation signal Sv. This coefficient of correlation represents a direction of increase or decrease in power loss with variation in frequency f.

LPF 425 extracts a DC component of the coefficient of correlation calculated by multiplier 424. An output from LPF 425 represents a direction of manipulation (a direction of increase or decrease) for changing frequency f to optimal frequency fx. When noise in output from multiplier 424 is low, LPF 425 does not have to be provided.

Controller 426 calculates an amount of manipulation (an amount of variation) of frequency f for changing frequency f to optimal frequency fx based on an output from LPF 425. Controller 426 calculates an amount of manipulation of frequency f by carrying out integral control (I control) with an output signal from LPF 425 being received as an input.

Adder 427 adds oscillation signal Sv generated by oscillation signal generator 421 to the output from controller 426, and outputs the calculated value to frequency setting unit 450 (FIG. 8) as final frequency manipulation amount Δf2. Under the control as above, optimal frequency fx at which power loss in power transmission device 10 is minimized is found so that power loss in power transmission device 10 can be minimized.

Referring again to FIG. 8, turn-on current control unit 430 receives a value of turn-on current It detected by It detector 440. When turn-on current It exceeds the restriction value, turn-on current control unit 430 calculates a frequency manipulation amount Δf3 in a direction for lowering turn-on current It and outputs the frequency manipulation amount to frequency setting unit 450. When turn-on current It is equal to or smaller than the restriction value (turn-on current control is inactive), turn-on current control unit 430 outputs frequency manipulation amount Δf3 set to 0.

Turn-on current control unit 430 receives a notification to the effect that power startup processing is being performed from transmission power control unit 410. This notification is used for determining whether transmission power control unit 410 is performing power startup processing or efficiency optimization control unit 420 is carrying out efficiency optimization control in succession to power startup processing. Turn-on current control unit 430 may receive a notification to the effect that efficiency optimization control is being carried out from efficiency optimization control unit 420 in order to determine whether or not efficiency optimization control is being carried out.

While turn-on current control unit 430 is carrying out turn-on current control (while turn-on current It is more than the restriction value), it outputs a notification to that effect to transmission power control unit 410 and efficiency optimization control unit 420. As described above, in response to this notification, during turn-on current control, transmission power control (including power startup processing) by transmission power control unit 410 and efficiency optimization control by efficiency optimization control unit 420 are stopped.

Figure 10:
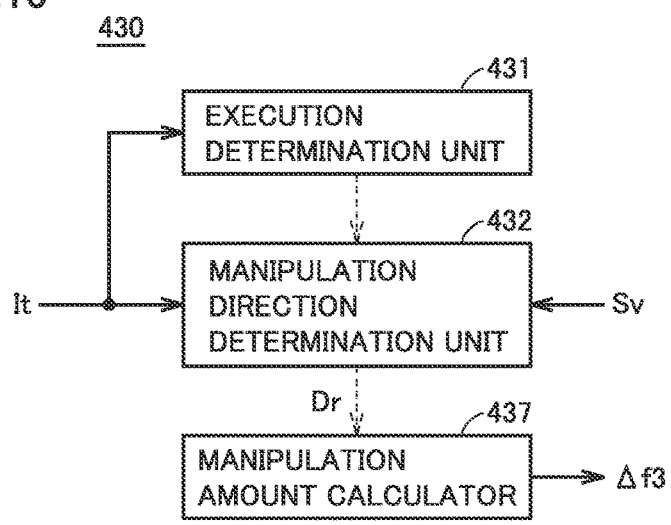
FIG. 10 is a control block diagram of a turn-on current control unit shown in FIG. 8.

FIG. 10 is a control block diagram of turn-on current control unit 430 shown in FIG. 8. Referring to FIG. 10, turn-on current control unit 430 includes an execution determination unit 431, a manipulation direction determination unit 432, and a manipulation amount calculator 437.

Execution determination unit 431 determines whether or not turn-on current It has exceeded the restriction value. This restriction value is positive and set as appropriate based on resistance of inverter 220 against a recovery current. Execution determination unit 431 outputs a signal indicating execution of turn-on current control to manipulation direction determination unit 432 when turn-on current It is more than the restriction value. Based on this signal, a notification to the effect that turn-on current control is being carried out is output to transmission power control unit 410 and efficiency optimization control unit 420.

Manipulation direction determination unit 432 determines a frequency manipulation direction Dr for lowering turn-on current It while turn-on current control is being carried out. A method of determining direction Dr of manipulation of frequency f is different between efficiency optimization control by efficiency optimization control unit 420 and power startup processing by transmission power control unit 410.

When efficiency optimization control is being carried out at the time when execution determination unit 431 determines that turn-on current It is more than the restriction value, manipulation direction determination unit 432 determines manipulation direction Dr based on a direction of variation in turn-on current It at the time when frequency f is varied (first processing). In the embodiment, oscillation signal Sv in efficiency optimization control is used as means for varying frequency f in the first processing as described above. On the other hand, when power startup processing is being performed at the time of determination that turn-on current It is more than the restriction value, manipulation direction determination unit 432 determines manipulation direction Dr so as to manipulate frequency f toward the startup frequency (second processing).

Figure 11:
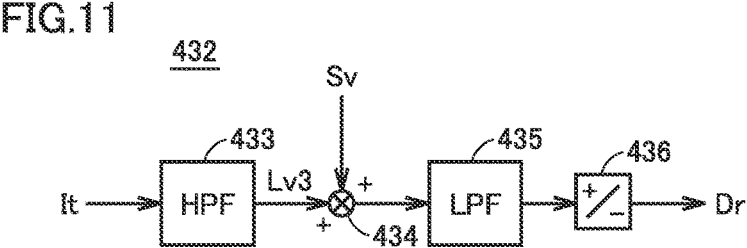
FIG. 11 is a control block diagram of first processing in a manipulation direction determination unit shown in FIG. 10.

FIG. 11 is a control block diagram of the first processing in manipulation direction determination unit 432 shown in FIG. 10. Referring to FIG. 11, manipulation direction determination unit 432 includes an HPF 433, a multiplier 434, an LPF 435, and a sign extractor 436.

HPF 433 extracts a high-frequency component Lv3 from a waveform of turn-on current It and outputs the high-frequency component to multiplier 434. High frequency component Lv3 represents an amount of variation in turn-on current It when frequency f is oscillated by oscillation signal Sv.

Multiplier 434 calculates a coefficient of correlation between oscillation signal Sv and high-frequency component Lv3 by multiplying high-frequency component Lv3 output from HPF 433 by oscillation signal Sv. This coefficient of correlation represents a direction of increase or decrease in turn-on current It with variation in frequency f.

LPF 435 extracts a DC component of the coefficient of correlation calculated by multiplier 434. Sign extractor 436 provides an output from LPF 435, with its sign being reversed. The sign provided by sign extractor 436 indicates frequency manipulation direction Dr for lowering turn-on current It.

Referring again to FIG. 10, manipulation amount calculator 437 calculates frequency manipulation amount Δf3 in a direction for lowering turn-on current It based on direction Dr of manipulation of frequency f determined by manipulation direction determination unit 432. For example, manipulation amount calculator 437 calculates a value obtained by multiplying an amount of frequency change (a positive value) set in advance by manipulation direction Dr as frequency manipulation amount Δf3.

Figure 12:
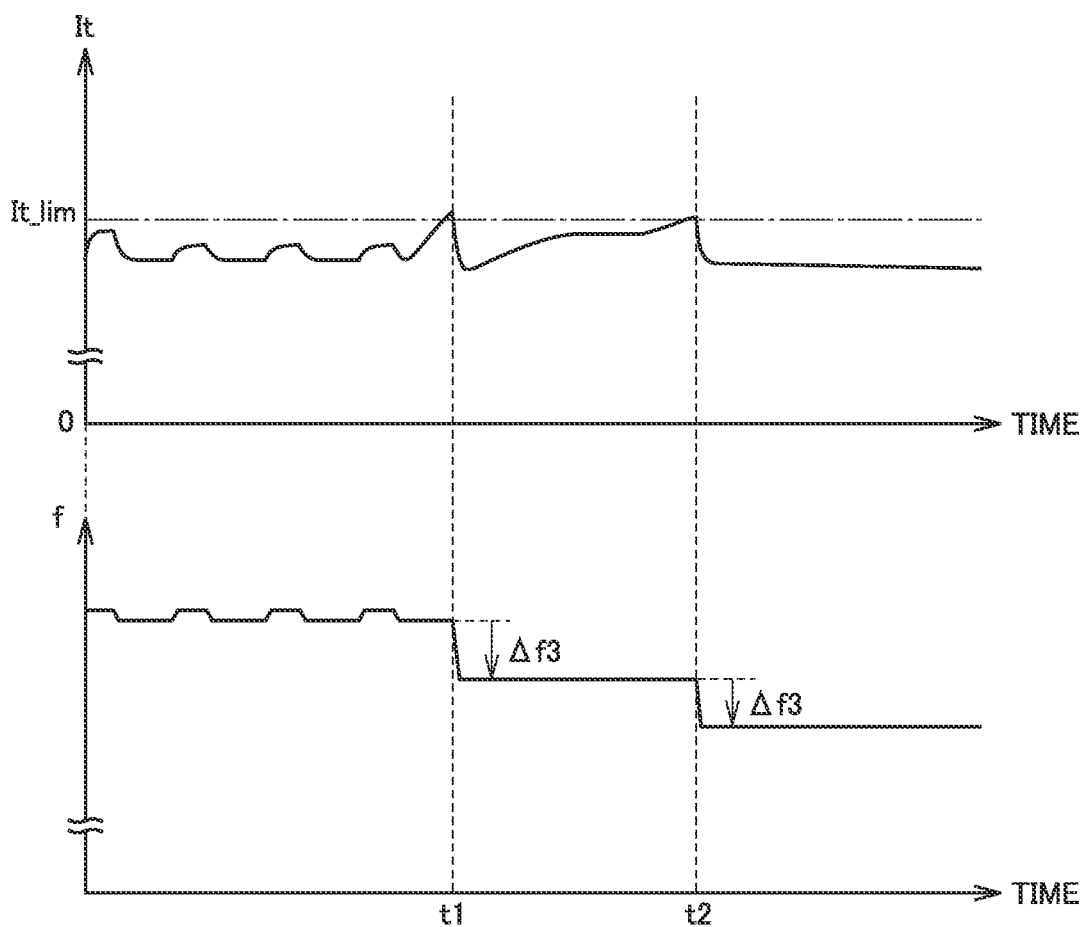
FIG. 12 is a diagram showing one example of manipulation of frequency f under turn-on current control.

FIG. 12 is a diagram showing one example of manipulation of frequency f under turn-on current control. Referring to FIG. 12, when turn-on current It exceeds restriction value It_lim at time t1, turn-on current control unit 430 determines a frequency manipulation direction for lowering turn-on current It. In this example, the direction to lower frequency f is determined as the frequency manipulation direction for lowering turn-on current It. Frequency f is then lowered by frequency manipulation amount Δf3 under turn-on current control, and consequently turn-on current It is lowered to restriction value It_lim or less.

When turn-on current It again exceeds restriction value It_lim at time t2 due to variation in coefficient of coupling or temperature, turn-on current control unit 430 determines again a frequency manipulation direction for lowering turn-on current It. The direction to lower frequency f is again determined as the direction of manipulation of frequency f, and frequency f is lowered by frequency manipulation amount Δf3 under turn-on current control, and consequently turn-on current It is lowered to restriction value It_lim or less.

Referring again to FIG. 8, frequency setting unit 450 adds an integrated value of frequency manipulation amounts Δf1, an integrated value of frequency manipulation amounts Δf2, and an integrated value of frequency manipulation amounts Δf3 to the startup frequency, and outputs to drive signal generator 460, a result of calculation as a command value for frequency f.

Drive signal generator 460 generates a drive signal for inverter 220 based on duty command value duty received from transmission power control unit 410 and the command value for frequency f received from frequency setting unit 450. As inverter 220 is driven in accordance with the drive signal generated by drive signal generator 460, a duty of output voltage Vo from inverter 220 attains to a value corresponding to duty command value duty, and frequency f of transmission power attains to a value corresponding to the command value.

Figure 13:
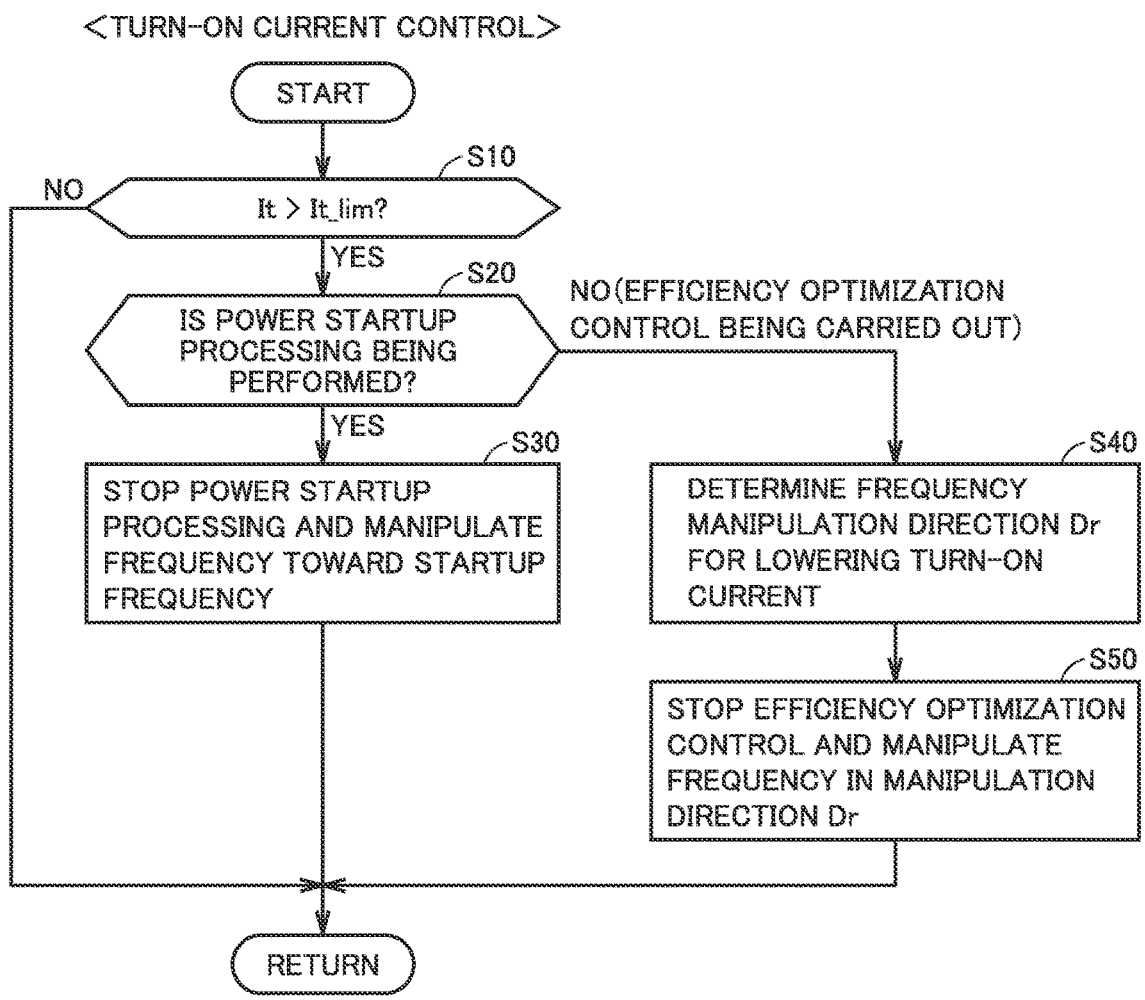
FIG. 13 is a flowchart showing one example of a processing procedure in turn-on current control carried out by the power supply ECU.

FIG. 13 is a flowchart showing one example of a processing procedure in turn-on current control carried out by power supply ECU 250. A series of processing shown in this flowchart is repeatedly performed every prescribed time.

Referring to FIG. 13, power supply ECU 250 detects turn-on current It and determines whether or not detected turn-on current It is more than restriction value It_lim (step S10). When turn-on current It is equal to or less than restriction value It_lim (NO in step S10), power supply ECU 250 has the process make transition to return without performing a series of subsequent processing.

When turn-on current It is determined in step S10 as being more than restriction value It_lim (YES in step S10), power supply ECU 250 determines whether or not power startup processing is being performed (step S20).

When power startup processing is determined in step S20 as being performed (YES in step S20), power supply ECU 250 stops power startup processing and manipulates frequency f toward the startup frequency (step S30). Specifically, power supply ECU 250 controls inverter 220 so as to maintain a duty of output voltage Vo from inverter 220 at a previous value (upper limit), set frequency manipulation amount Δf1 in power startup processing to 0, and change frequency f toward the startup frequency in accordance with frequency manipulation amount Δf3 under turn-on current control.

When power startup processing is determined in step S20 as not being performed, that is, it is determined that efficiency optimization control is being carried out (NO in step S20), power supply ECU 250 senses a direction of variation in turn-on current It with variation in frequency f by using oscillation of frequency f by oscillation signal Sv under efficiency optimization control and determines frequency manipulation direction Dr for lowering turn-on current It (step S40).

Power supply ECU 250 then stops efficiency optimization control and manipulates frequency f in manipulation direction Dr determined in step S40 (step S50). Specifically, power supply ECU 250 controls inverter 220 so as to set frequency manipulation amount Δf2 under efficiency optimization control to 0 and change frequency f in manipulation direction Dr in accordance with frequency manipulation amount Δf3 under turn-on current control.

As set forth above, according to the embodiment, when turn-on current It is more than restriction value It_lim, frequency manipulation direction Dr for lowering turn-on current It is determined based on a direction of variation in turn-on current It at the time of actual variation in frequency f (under efficiency optimization control). Therefore, turn-on current It can reliably be suppressed.

When power startup processing is being performed at the time when turn-on current It exceeds restriction value It_lim, the direction of manipulation of frequency f from the startup frequency is in conformity with the direction of increase in transmission power. Therefore, turn-on current It can be lowered by lowering transmission power by manipulating frequency f toward the startup frequency.

According to the embodiment, frequency manipulation direction Dr for lowering turn-on current It is determined by using oscillation of frequency f by oscillation signal Sv under efficiency optimization control. Therefore, the direction of manipulation of frequency f under turn-on current control can be determined in coordination with efficiency optimization control.

Depending on a situation, turn-on current It may not be lowered to the restriction value or less in spite of turn-on current control. Though turn-on current control is control for manipulating frequency f to lower turn-on current It when turn-on current It is more than the restriction value, turn-on current It may not be lowered to the restriction value or less depending on a situation in spite of manipulation of frequency f in accordance with frequency manipulation amount Δf3 under turn-on current control.

In such a case, in order to protect inverter 220, power transmission is preferably suspended. When turn-on current It does not become lower than the restriction value in spite of suspension and resumption of power transmission and repeated stop and resumption of power transmission as such, power transmission is preferably resumed with the startup frequency being changed. By changing the startup frequency, an operating point (a frequency and a duty) of inverter 220 may be changed, and such a situation that turn-on current It is not lowered to the restriction value or less in spite of turn-on current control can be avoided.

Figure 14:
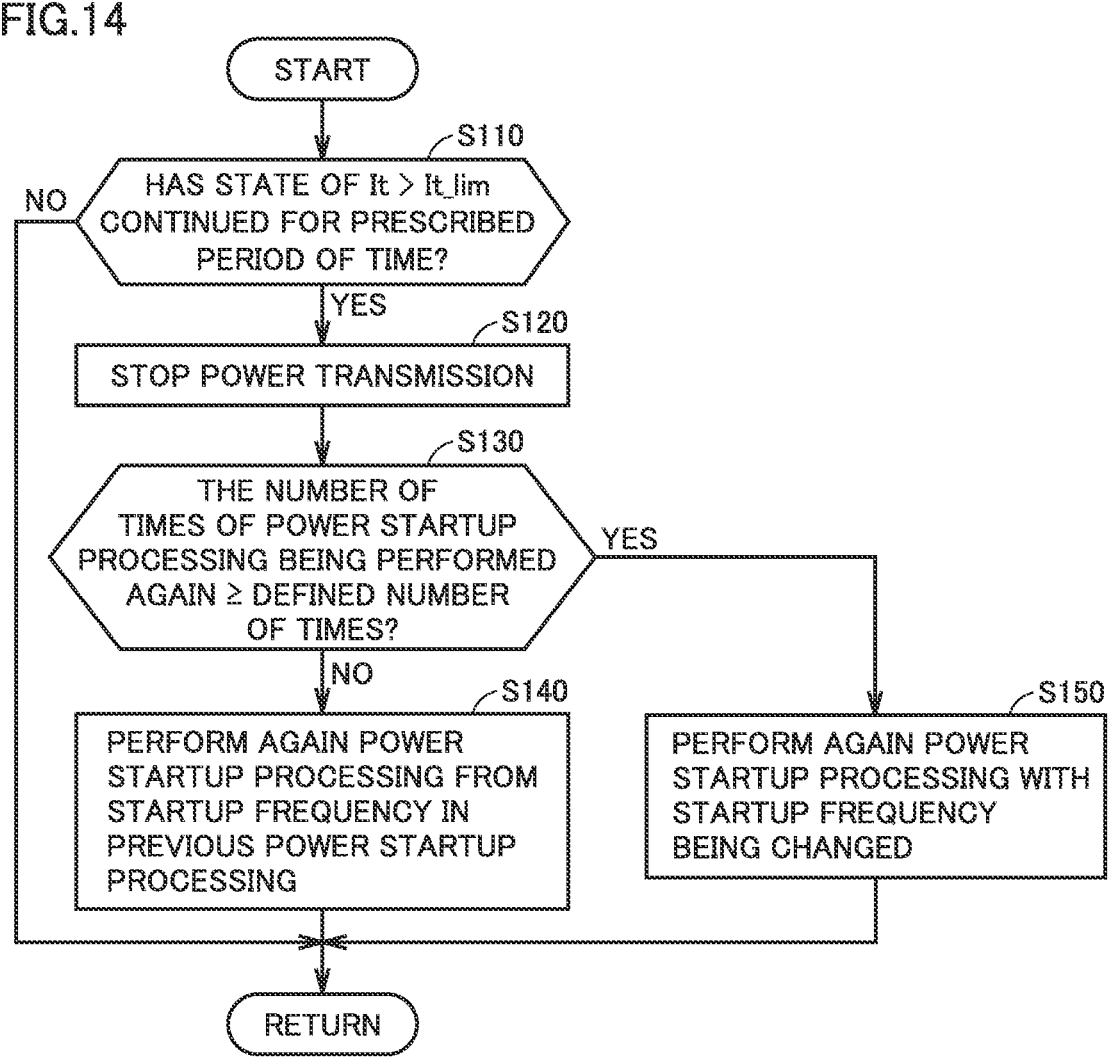
FIG. 14 is a flowchart showing one example of a processing procedure when a turn-on current does not become lower than a restriction value in spite of turn-on current control.

FIG. 14 is a flowchart showing one example of a processing procedure when turn-on current It does not become lower than the restriction value in spite of turn-on current control. A series of processing shown in this flowchart is also repeatedly performed every prescribed time.

Referring to FIG. 14, power supply ECU 250 determines whether or not a state that turn-on current It is more than restriction value It_lim (a state determined as YES in step S10 in FIG. 13) has continued for a prescribed period of time (step S110). The prescribed period of time is set, for example, based on an expected longest period of time (a designed value) until turn-on current It becomes lower than the restriction value by carrying out turn-on current control. When the state has not continued for a prescribed period of time (NO in step S110), power supply ECU 250 has the process make transition to return without performing a series of subsequent processing.

When it is determined in step S110 that the state that turn-on current It is more than restriction value It_lim has continued for the prescribed period of time (YES in step S110), power supply ECU 250 suspends power transmission by having inverter 220 stop generation of transmission power (step S120). As power transmission is stopped, turn-on current control is also stopped.

Thereafter, in performing again power startup processing, power supply ECU 250 determines whether or not the number of times of power startup processing performed again has reached a defined number of times (step S130). For example, two times or an appropriate number of times equal to or more than two times is set as the defined number of times.

When it is determined in step S130 that the number of times of processing performed again has not reached the defined number of times (NO in step S130), power supply ECU 250 performs again power startup processing from the startup frequency in previous power startup processing (step S140). A certain time interval from suspension of power transmission until performing again power startup processing may be set.

When it is determined in step S130 that the number of times of processing performed again has reached the defined number of times (YES in step S130), power supply ECU 250 performs again power startup processing with the startup frequency being changed (step S150). For example, when upper limit fb of an available frequency band defined under the specifications has been set as the startup frequency until the previous power startup processing, power startup processing is performed again with the startup frequency being changed to lower limit fa of the frequency band. The operating point of inverter 220 may thus be changed, and a situation that turn-on current It does not become lower in spite of turn-on current control at the time when turn-on current It reaches the restriction value can be avoided.

Though an embodiment of the present disclosure has been described above, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A wireless power transmission device comprising:
a power transmitter configured to wirelessly transmit power to a power reception device;
an inverter configured to generate transmission power at a prescribed frequency and supply transmission power to the power transmitter; and
a controller configured to carry out turn-on current control for controlling a turn-on current to a restriction value or less by manipulating the frequency by means of the inverter,
the turn-on current control including first processing for determining, based on a direction of variation in the turn-on current when the frequency is varied, a direction of manipulation of the frequency for lowering the turn-on current.

2. The wireless power transmission device according to claim 1, wherein
the controller is further configured to carry out
power control for controlling the transmission power to a target, and
efficiency optimization control for searching for, by oscillating the frequency, an optimal frequency for improving efficiency, while the transmission power is controlled to the target under the power control, and
the first processing includes processing for determining the direction of manipulation of the frequency based on the direction of variation in the turn-on current in accordance with oscillation of the frequency under the efficiency optimization control.

3. The wireless power transmission device according to claim 1, wherein
the controller is configured to further carry out power control for controlling the transmission power to a target,
the power control includes power startup processing for having the transmission power reach the target by manipulating the frequency, after a duty of an output voltage from the inverter is increased to a prescribed value at a prescribed startup frequency, and
the turn-on current control includes second processing for manipulating the frequency toward the startup frequency, while the power startup processing is being carried out when the turn-on current exceeds the restriction value.

4. The wireless power transmission device according to claim 1, wherein
the controller controls the inverter so as to stop generation of the transmission power when the turn-on current is more than the restriction value in spite of the turn-on current control.

5. The wireless power transmission device according to claim 3, wherein
the controller is configured to control the inverter so as to stop generation of the transmission power when the turn-on current is more than the restriction value in spite of the turn-on current control, and perform again the power startup processing with the startup frequency being changed, after the controller has generation of the transmission power stopped.

6. A wireless power transfer system comprising:

a power transmission device; and a power reception device configured to wirelessly receive power from the power transmission device, the power transmission device including a power transmitter configured to wirelessly transmit power to the power reception device, an inverter configured to generate transmission power at a prescribed frequency and supply transmission power to the power transmitter, and a controller configured to carry out turn-on current control for controlling a turn-on current to a restriction value or less by manipulating the frequency by means of the inverter, the turn-on current control including processing for determining, based on a direction of variation in the turn-on current when the frequency is varied, a direction of manipulation of the frequency for lowering the turn-on current.

* * * * *